May 24, 1960   G. W. JACKSON ET AL   2,937,715
LUBRICATION SYSTEM FOR GAS COMPRESSOR
Filed Sept. 19, 1957   3 Sheets-Sheet 1

INVENTOR.
George W. Jackson
Frank E. LaFlame
BY John F. Pribonic
D. C. Staley
Their Attorney INVENTORS
GEORGE W. JACKSON
FRANK E. LaFLAME
JOHN F. PRIBONIC
BY D.C. Staley
THEIR ATTORNEY INVENTORS
George W. Jackson
Frank E. LaFlame
BY John F. Pribonic D.C. Staley
Their Attorney

United States Patent Office 2,937,715
Patented May 24, 1960

2,937,715

LUBRICATION SYSTEM FOR GAS COMPRESSOR

George W. Jackson, Frank E. La Flame, and John F. Pribonic, all of Dayton, Ohio, assignors to General Motors Corporation, Detroit, Mich., a corporation of Delaware Filed Sept. 19, 1957, Ser. No. 684,899

11 Claims. (Cl. 184—6)

This invention relates to gas compressors and particularly to the lubrication system for the same. In this invention the gas compressor is of the type having a crankcase and a cylinder with a piston that reciprocates in the cylinder and including a crankshaft journaled in the crankcase that is operably connected with the piston for reciprocating the piston in the cylinder.

The crankcase of the compressor is adapted to be scavenged of oil so that the crankcase will remain relatively oil free during operation of the compressor to reduce as much as possible passage of oil past the piston of the compressor which tends to deliver the oil into the gas system.

The lubrication system for the gas compressor is such that one oil pump is drivingly connected with the crankshaft of the compressor for operation concurrently with the crankshaft to scavenge oil from the crankcase whenever the compressor is operating and deliver the oil to a reservoir that is independent of the compressor crankcase. A second oil pump is drivingly connected with the crankshaft of the compressor for concurrent operation therewith to deliver oil under pressure from the reservoir to the bearings of the compressor, this oil pressure lubrication system being provided with a pressure actuated valve that relieves pressure in the pressure lubrication system above a predetermined value.

In the lubrication system for the gas compressor the reservoir for the oil for the lubrication system is independent of the crankcase of the compressor and comprises a main reservoir and a secondary reservoir. The oil pump that scavenges oil from the crankcase of the compressor delivers the scavenged oil into the secondary reservoir while the oil pump that delivers oil under pressure to the lubrication system for the bearings of the compressor receives its oil from the secondary reservoir. The secondary reservoir is considerably smaller in volume than the main reservoir so that when the compressor is inactive only the volume of oil in the secondary reservoir has any possibility of leaking into the crankcase of the compressor and thereby avoid flooding of the crankcase of the compressor during any prolonged period of inactivity of the compressor.

The oil reservoir is also provided with an oil pump, or lift pump that is drivingly connected with the crankshaft of the compressor that extends into the oil reservoir to provide for supplying the secondary reservoir with oil from the main or primary reservoir during periods of operation of the compressor.

Further objects and advantages of the present invention will be apparent from the following description, reference being had to the accompanying drawings wherein a preferred form of the invention is clearly shown.

Figure 1:
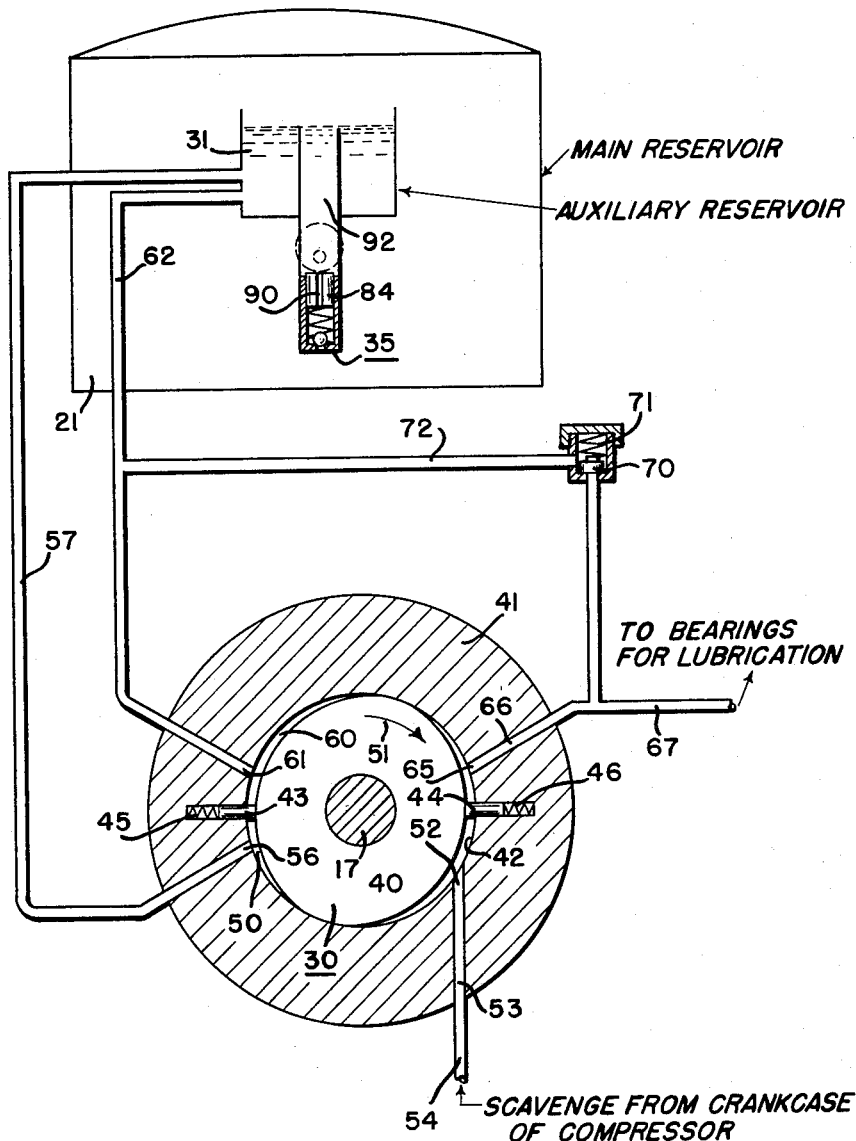
Figure 1 is a schematic representation of the lubrication system for the gas compressor.

In this invention the gas compressor consists of a crankcase 10 having one or more cylinders 11. The compressor illustrated consists of two cylinders but only one has been shown in the drawing. The cylinders 11 each receive a piston 12 that is connected to a crankshaft 13 by means of connecting rods 14. The crankshaft 13 has a forward journal 15 supported within the bearing 16 and a rear journal 17 carried within the bearing 18. The journal bearing 18 of the compressor is supported within a wall 19 that closes one side of the compressor crankcase 10, the wall 19 also providing for separation of the crankcase interior 20 from the reservoir 25 and its interior 21.

The interior 20 of the crankcase 10 is vented to atmosphere through a passage 22 provided in the counterweight 23 and the axial passage 24 in the front journal 15, a suitable cap 26 being provided on the end of the journal 15 that has passages 27 connected with the passage 24 for venting of the interior 20 of the crankcase.

A wall 19 of the compressor supports a dual pumping unit 30 that has one oil pump adapted to scavenge oil from the interior 20 of the compressor crankcase and deliver it to the reservoir 25 and a second oil pump that is adapted to remove oil from the reservoir 25 and deliver it under pressure to lubricant passages provided in the crankshaft for lubrication of the crankshaft journals. These pumping units are more specifically described hereinafter.

The reservoir 25 is secured to the wall 19 of the compressor by any suitable fastening means (not shown). This reservoir 25 comprises a main reservoir chamber 21 and a secondary reservoir chamber 31. The secondary reservoir chamber 31 is supplied with oil from the main reservoir chamber 21 by means of a lift pump 35, more particularly described hereinafter, that is drivingly connected with the crankshaft 15 for operation concurrently with operation of the compressor so that oil will be continuously supplied to the secondary reservoir 31 so long as the compressor operates. The pumping capacity of the lift pump 35 is slightly larger than the pumping capacity of the pump unit that supplies oil under pressure to the bearings of the compressor to insure an adequate supply of oil in the secondary reservoir 31. Excess oil pumped by the lift pump 35 discharges over the upper edge of the secondary reservoir back into the main reservoir 21.

Figure 2:
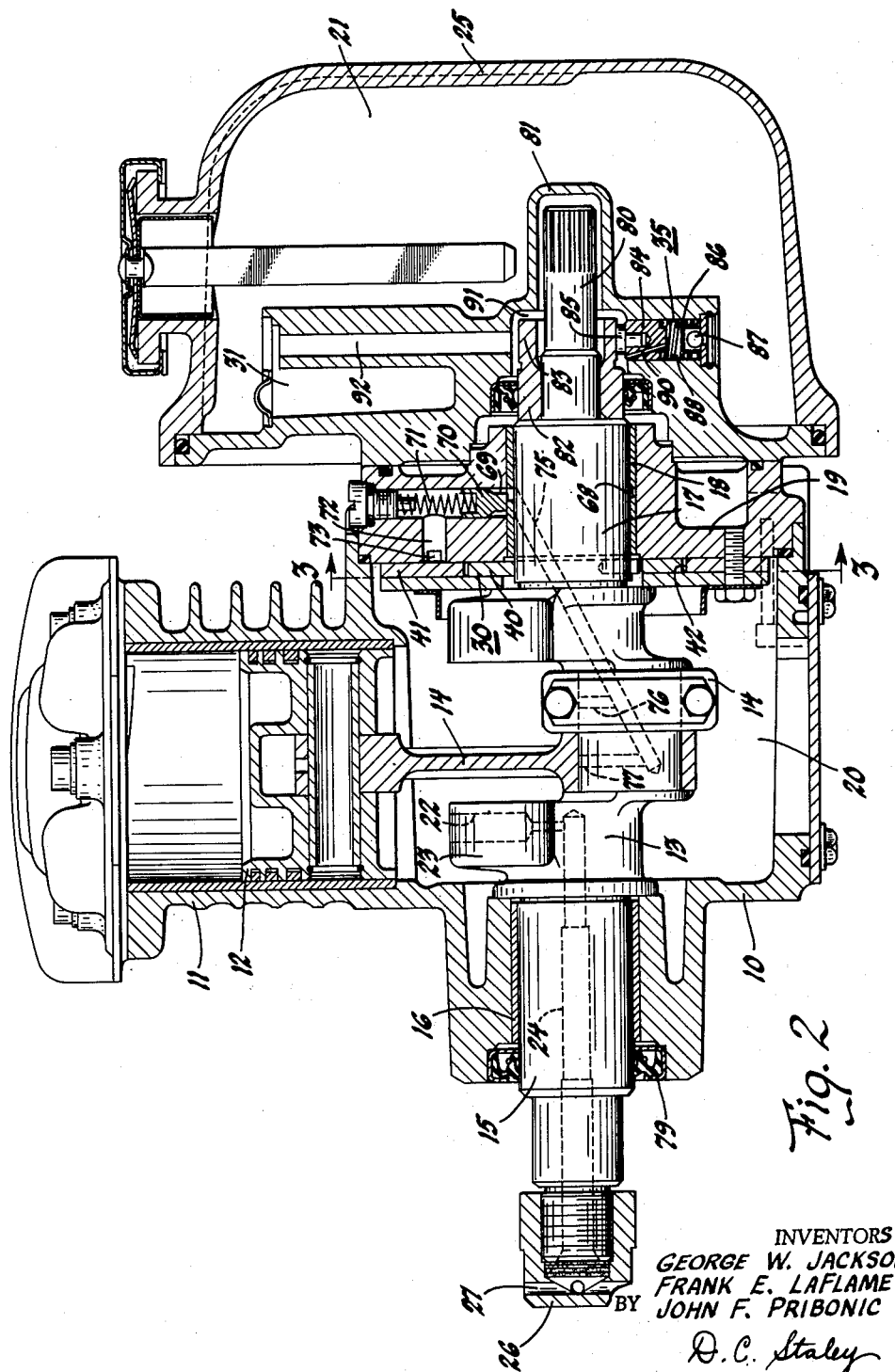
Figure 2 is a longitudinal cross sectional view of the gas compressor and illustrates the relative positions of the compressor, its lubrication and scavenge oil pumps and the oil reservoir for the compressor.

The lubrication system for the compressor is schematically illustrated in Figure 1 wherein the pumping unit 30 includes a rotor element 40 keyed to the crankshaft journal 17 for rotation therewith. The rotor element 40 is substantially eliptical in peripheral contour and rotates within a stator element 41 having the pump cavity 42 that receives the rotor 40. Vane members 43 and 44 are disposed on diametrically opposite sides of the pump cavity 42 and are spring urged into engagement with the periphery of the rotor 40 by compression springs 45 and 46. These pump elements are more particularly shown in Figures 2 and 3.

With the vanes 43 and 44 positioned on diametrically opposite sides of the pump chamber 42, the pump unit 30 is thus divided into two individual pump chambers 50 and 60, the rotor element 40 having the direction of rotation indicated by the arrow 51. The pump chamber 50 has an inlet port 52 that is connected by a passage 53 to an opening 54 that enters into the lower portion of the crankcase chamber 20. Thus rotation of the rotor 40 will draw in oil through the passage 53 into the pumping chamber 50. Oil drawn into the pumping chamber 50 will be discharged through the port 56 and thence through the passage 57 into the secondary reservoir chamber 31, as more particularly shown in Figures 3 and 6, the passage 57 in Fig. 1 being represented by a conduit line connecting the port 56 with the secondary reservoir chamber 31.

Thus it will be seen that rotation of the rotor 40 by the crankshaft 15 will continuously draw oil from the bottom of the crankcase chamber 20 and discharge it into the secondary reservoir chamber 31, the pump providing for a continuous scavenging of the oil from the crankcase chamber 20 during operation of the compressor whereby the maintain the crankcase substantially free of oil at all times.

Figure 3:
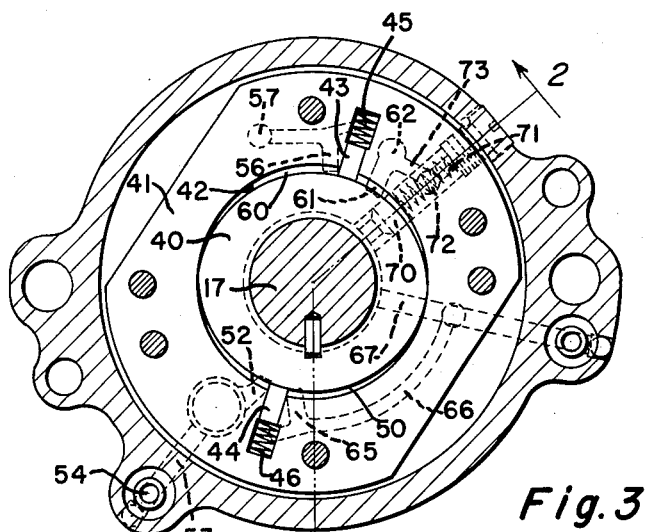
Figure 3 is a cross sectional view taken substantially along line 3—3 of Fig. 2 illustrating the lubrication and scavenge oil pumps, the single pump structure being divided into two independent pumping units.
Figure 6:
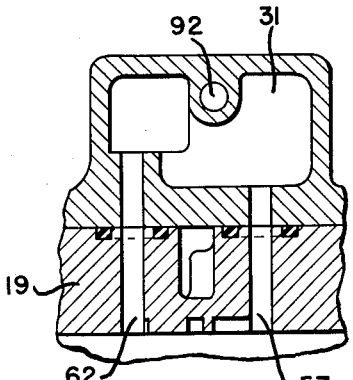
Figure 6 is a cross sectional view illustrating the oil connections between the reservoir and the oil pumps.
Figure 5:
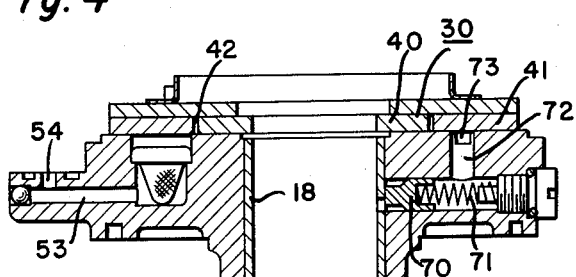
Figure 5 is a cross sectional view showing the inlet passage to the scavenge pump.

Rotation of the rotor 40 will also produce pumping of oil in the pump chamber 60, the pump chamber 60 having a port 61 that is connected by a passage 62 with the secondary reservoir chamber 31, as illustrated in Figures 3 and 6, this passage 62 being represented by a conduit in Fig. 1 that connects the port 61 with the secondary reservoir chamber 31. Oil drawn into the pumping chamber 60 through the passage 62 is discharged from the pumping chamber 60 through the port 65 and thence through the passage 66 to a passage 67 that delivers the oil under pressure to the rear bearing 18 of the compressor. The rear bearing 18 has an annular recess 68 with which the conduit 67 is connected, this recess also being connected with a passage 69 that includes a pressure actuated bypass valve 70 normally held in a closed position by the spring 71. When the pressure of the oil being discharged from the pump chamber 60 through the port 65 and the passage 67 is greater than a predetermined value, the valve 70 will be urged upwardly against the spring 71 so that excess oil can pass through the passage 72 and thence through the passage 73 to the inlet port 61 of the pumping chamber 60 whereby to bypass the excess oil pressure directly from the discharge side of the pumping chamber 60 to the inlet side thereof, as specifically illustrated in Figures 2 and 3, the various passages referred to being disclosed as conduits in the schematic diagram of Figure 1.

Figure 4:
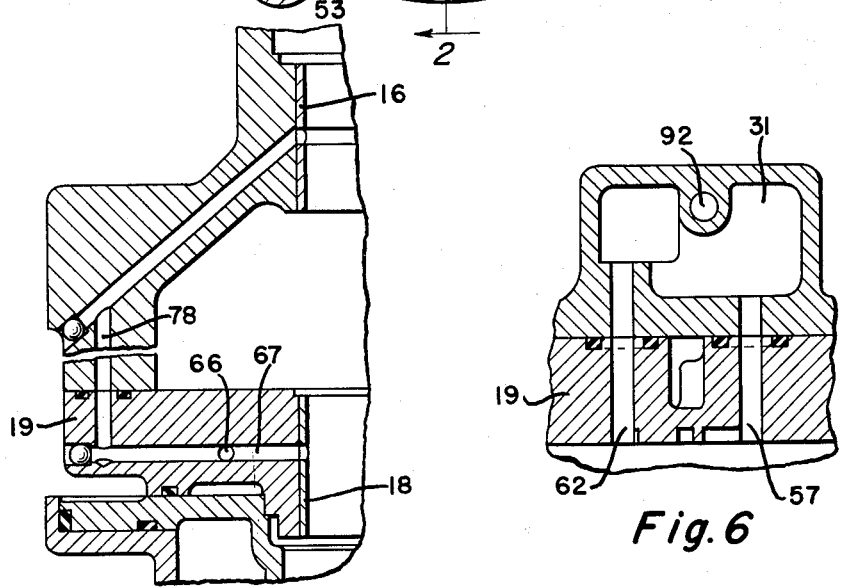
Figure 4 is a cross sectional view illustrating some of the oil passages for lubricating the front bearing of the compressor from the rear bearing.

To lubricate the several bearings of the compressor, the crankshaft 15 has a drilled passage 75 connected with radial passages 76 and 77 that feed oil to the connecting rods 14. Also, as illustrated in Figure 4, the passage 67 that delivers oil to the rear bearing 18 is connected by way of a passage 78 with the front bearing 16.

An oil seal 79 is provided around the front journal 15 to prevent loss of oil.

The crankshaft 15 has a rear extension 80 that projects into the main reservoir chamber 21, the reservoir chamber 21 having a wall 81 that encloses the end 80 of the crankshaft. A collar 82 is carried by the end 80 of the crankshaft 15 and rotates with the crankshaft, this collar 82 having an eccentric portion 83 that operates the lift pump 35 for delivering oil from the main reservoir chamber 21 into the secondary chamber 31 whenever the compressor is operating.

The lift pump 35 consists of a piston element 84 having a wear button 85 that engages the eccentric 83 as held thereagainst by a compression spring 86. A one-way check valve 87 is provided in the bottom of the cylinder 88 in which the piston 84 reciprocates to allow oil to flow into the cylinder 88 but prevents it from returning back into the chamber 21. A small passage 90 is provided in the piston 84 to allow oil to pass from the cylinder chamber 88 below the piston 84 into the chamber 91 around the collar 82 and thence into the vertical passage 92 from which the oil spills over into the secondary reservoir 31 to retain the secondary reservoir filled with oil so long as the compressor is operating. Any excess oil delivered by the lift pump 35 will spill over the top of the reservoir 31 and return into the main reservoir 21.

While the form of embodiment of the invention as herein disclosed constitutes a preferred form, it is to be understood that other forms might be adopted as may come within the scope of the claims which follow.

What is claimed is as follows:

1. A lubrication system for a gas compressor that has a crankcase and cylinder means with piston means operating in the cylinder and with crankshaft means journaled in the crankcase and connected with the piston means for operation thereof and adapted for mobile vehicle installation, including in combination, oil reservoir means separate from the compressor crankcase disposed at or above the level of the crankcase and consisting of a main reservoir and a secondary reservoir of smaller volume than the main reservoir, said secondary reservoir having overflow connection with said main reservoir, first oil pump means connected with the compressor crankcase and with said secondary reservoir to remove oil from the compressor crankcase and deliver the same to said secondary reservoir to retain the compressor crankcase substantially free of oil and provide oil supply to the secondary reservoir, second oil pump means connected with said secondary reservoir and with the crankshaft journal means in the compressor crankcase to remove oil from said secondary reservoir and deliver the same under pressure to the crankshaft journals for pressure lubrication thereof, both said oil pump means having driving connection with the compressor crankshaft for continuous operation with the compressor, and third pump means having driving connection with the compressor crankshaft for continuous operation with the compressor for supplying oil to said secondary reservoir from said main reservoir to insure a supply of oil maintaining said secondary reservoir filled during operation of the compressor.

2. A lubrication system for a gas compressor that has a crankcase and cylinder means with piston means operating in the cylinder and with crankshaft means journaled in the crankcase and connected with the piston means for operation thereof and adapted for mobile vehicle installation, including in combination, oil reservoir means separate from the compresor crankcase disposed at or above the level of the crankcase and consisting of a main reservoir and a secondary reservoir of smaller volume than the main reservoir, said secondary reservoir having overflow connection with said main reservoir, first oil pump means connected with the compressor crankcase and with said secondary reservoir to remove oil from the compressor crankcase and deliver the same to said secondary reservoir to retain the compressor crankcase substantially free of oil and provide oil supply to the secondary reservoir, second oil pump means connected with said secondary reservoir and with the crankshaft journal means in the compressor crankcase to remove oil from said secondary reservoir and deliver the same under pressure to the crankshaft journals for pressure lubrication thereof, both said oil pump means having driving connection with the compressor crankshaft for continuous operation with the compressor, and third pump means having driving connection with the compressor crankshaft for continuous operation with the compressor for supplying oil to secondary reservoir from said main reservoir to insure a supply of oil in maintaining said secondary reservoir filled during operation of the compressor, and valve means actuated by the pressure of the oil at the crankshaft journal to bypass oil above a predetermined pressure value from the discharge side of said second oil pump means to the inlet side thereof.

3. A lubrication system for a gas compressor that has a crankcase and cylinder means with piston means operating in the cylinder and with crankshaft means journaled in the crankcase and connected with the piston means for operation thereof and adapted for mobile vehicle installation, including in the combination, oil reservoir means separate from the compressor crankcase disposed at or above the level of the crankcase and consisting of a main reservoir and a secondary reservoir of substantially smaller volume than the main reservoir positioned in the main reservoir and overflowing thereinto, first oil pump means connected with the compressor crankcase and with said secondary reservoir to remove oil from the compressor crankcase and deliver the same to said secondary reservoir to retain the compressor crankcase substantially free of oil at all times and provide oil supply to the secondary reservoir, second oil pump means connected with said secondary reservoir and with the crankshaft journal means in the compressor crankcase to remove oil from said secondary reservoir and deliver the same under pressure to the crankcase journals for pressure lubrication thereof, both said oil pump means having driving connection with the compressor crankshaft for continuous operation with the compressor, and third pump means having driving connection with the compressor crankshaft for continuous operation with the compressor for removing oil from said main reservoir and supplying the same to said secondary reservoir continuously during operation of the compressor to insure a supply of lubricant maintaining said secondary reservoir filled during the compressor operation.

4. A lubrication system for a gas compressor in accordance with claim 3 in which said first and second oil pump means are disposed in the compressor crankcase in direct drive connection with the compressor crankshaft and said third oil pump means is independent of said first and second oil pump means and is disposed within the main reservoir in direct drive connection with the compressor crankshaft.

5. In a gas compressor, the combination of, a compressor crankcase having an open side and including cylinder means, a closure wall closing said open side and forming a journal wall for one end of a crankshaft, a crankshaft journaled in said crankcase with one end journaled in said said journal wall, piston means reciprocable in said cylinder means and drivingly connected with said crankshaft for reciprocation in the cylinder means, separate oil reservoir means carried on said closure wall adjacent to said crankcase and separated thereby from direct fluid connection with said crankcase, said reservoir including a main reservoir and a secondary reservoir therein of smaller volume than the main reservoir, said one end of said crankshaft projecting from said closure wall into said reservoir, oil pump means within said crankcase carried on said closure wall and drivingly connected with said crankshaft for operation of the pump means concurrently with the compressor, said oil pump means having a first pump portion delivering oil through passage means in said closure wall from the crankcase to the secondary reservoir to maintain the crankcase substantially free of oil during operation of the compressor and a second pump portion delivering oil under pressure through passage means in said closure wall from the secondary reservoir to the crankshaft journals for pressure lubrication thereof, and additional pump means in said reservoir drivingly connected with said shaft extension into said reservoir supplying oil to the secondary reservoir from said main reservoir so long as said compressor is in operation.

6. A gas compressor constructed in accordance with claim 5 in which the secondary reservoir is formed in a wall of said main reservoir and said additional pump means is disposed in the said wall, said journal shaft extending into the said reservoir wall in driving connection with the said additional pump means.

7. A gas compressor constructed in accordance with claim 6 in which seal means surround said shaft extension in said reservoir wall to prevent oil pressure at said journal end in said closure wall discharging into said reservoir.

8. In a gas compressor, the combination of, a compressor crankcase having an open side and including cylinder means, a closure wall closing said open side and forming a journal wall for one end of a crankshaft, a crankshaft journaled in said crankcase with one end journaled in said journal wall, piston means reciprocable in said cylinder means and drivingly connected with said crankshaft for reciprocation in the cylinder means, separate oil reservoir means carried on said closure wall adjacent to said crankcase and separated thereby from direct fluid connection with said crankcase, said reservoir including a main reservoir and a secondary reservoir therein of smaller volume than the main reservoir, said one end of said crankshaft projecting from said closure wall into said reservoir, oil pump means within said crankcase carried on said closure wall and drivingly connected with said crankshaft for operation of the pump means concurrently with the compressor, said oil pump means having a first pump portion delivering oil through passage means in said closure wall from the crankcase to the secondary reservoir to maintain the crankcase substantially free of oil during operation of the compressor and a second pump portion delivering oil under pressure through passage means in said closure wall from the secondary reservoir to the crankshaft journals for pressure lubrication thereof, and by-pass valve means in passage means in said closure wall actuated by oil pressure at said one journal to by-pass delivery of oil from said second pump portion to the inlet side of the said pump portion when pressure at the said one journal exceeds a predetermined value.

9. In a gas compressor, the combination of, a compressor having a cylinder and a crankcase having an open side, a removable crankcase closure wall closing said open side and having bearing means for a crankshaft, a crankshaft journaled in said bearing means, piston means reciprocable in said cylinder means and drivingly connected with said crankshaft, a separate main oil reservoir means positioned exteriorly of said crankcase closure wall retaining compressor lubricating oil completely separate from said crankcase, said main reservoir having a wall engaging said closure wall and providing therewith a common wall between said crankcase and said main reservoir, said reservoir wall having a chamber therein forming a secondary reservoir, oil pump means within said crankcase carried on the opposite side of said closure wall drivingly connected with said crankshaft for operation of the pump means concurrently with the compressor, said pump means having first and second pump portions, said closure wall having passage means connecting said first pump portion with said crankcase for removal of oil from the crankcase during operation of the compressor to maintain said crankcase substantially free of oil, said closure wall and reservoir wall having connecting passage means connected with said first pump portion for delivery of oil from the first pump portion to said secondary reservoir and also having passage means connecting said secondary reservoir with said second pump portion for supply of oil to said second pump portion, said closure wall having passage means connecting said second pump portion with passage means in said crankshaft for delivery of oil under pressure to the crankshaft bearing.

10. In a gas compressor, the combination of, a compressor having a cylinder and a crankcase having an open side, a removable crankcase closure wall closing said open side and having bearing means for a crankshaft, a crankshaft journaled in said bearing means, piston means reciprocable in said cylinder means and drivingly connected with said crankshaft, a separate main oil reservoir means positioned exteriorly of said crankcase closure wall retaining compressor lubricating oil completely separate from said crankcase, said main reservoir having a wall engaging said closure wall and providing therewith a common wall between said crankcase and said main reservoir, said reservoir wall having a chamber therein forming a secondary reservoir, oil pump means within said crankcase carried on the opposite side of said closure wall drivingly connected with said crankshaft for operation of the pump means concurrently with the compressor, said pump means having first and second pump portions, said closure wall having passage means connecting said first pump portion with said crankcase for removal of oil from the crankcase during operation of the compressor to maintain said crankcase substantially free of oil, said closure wall and reservoir wall having connecting passage means connected with said first pump portion for delivery of oil from the first pump portion to said secondary reservoir and also having passage means connecting said secondary reservoir with said second pump portion for supply of oil to said second pump portion, said closure wall having passage means connecting said second pump portion with passage means in said crankshaft for delivery of oil under pressure to the crankshaft bearing, said closure wall containing valve means actuated by oil pressure at the crankshaft bearing means to by-pass oil from the bearing means to the inlet side of said second pump portion when oil pressure at the bearing means exceeds a predetermined value.

11. In a gas compressor, the combination of, a compressor having a cylinder and a crankcase having an open side, a removable crankcase closure wall closing said open side and having bearing means for a crankshaft, a crankshaft journaled in said bearing means, piston means reciprocable in said cylinder means and drivingly connected with said crankshaft, a separate main oil reservoir means positioned exteriorly of said crankcase closure wall retaining compressor lubricating oil completely separate from said crankcase, said main reservoir having a wall engaging said closure wall and providing therewith a common wall between said crankcase and said main reservoir, said reservoir wall having a chamber therein forming a secondary reservoir, said crankshaft projecting through said bearing means and said closure wall into said reservoir wall, oil pump means within said crankcase carried on the opposite side of said closure wall drivingly connected with said crankshaft for operation of the pump means concurrently with the compressor, said pump means having first and second pump portions, said closure wall having passage means connecting said first pump portion with said crankcase for removal of oil from the crankcase during operation of the compressor to maintain said crankcase substantially free of oil, said closure wall and reservoir wall having connecting passage means connected with said first pump portion for delivery of oil from the first pump portion to said secondary reservoir and also having passage means connecting said secondary reservoir with said second pump portion for supply of oil to said second pump portion, said closure wall having passage means connecting said second pump portion with passage means in said crankshaft for delivery of oil under pressure to the crankshaft bearing, said closure wall containing valve means actuated by oil pressure at the crankshaft bearing means to by-pass oil from the bearing means to the inlet side of said second pump portion when oil pressure at the bearing means exceeds a predetermined value, and additional pump means in said reservoir wall drivingly connected with said shaft extension in the said reservoir wall supplying oil to passage means in said reservoir wall for flow into said secondary reservoir, said secondary reservoir overflowing into said main reservoir.

References Cited in the file of this patent

UNITED STATES PATENTS

| | | |
|---|---|---|
| 1,426,869 | Hazard | Aug. 22, 1922 |
| 2,194,710 | Metzgar | Mar. 26, 1940 |
| 2,234,777 | Puffer | Mar. 11, 1941 |
| 2,280,272 | Sullivan | Apr. 21, 1942 |
| 2,675,096 | Hetmann | Apr. 13, 1954 |

FOREIGN PATENTS

| | | |
|---|---|---|
| 716,443 | France | Oct. 6, 1931 |